2,900,264

METHOD OF CHANGING GLASS COMPOSITION

Wilbur F. Brown, Toledo, Ohio, assignor to Libbey-Owens-Ford Glass Company, Toledo, Ohio, a corporation of Ohio No Drawing. Application April 20, 1955
Serial No. 502,728

2 Claims. (Cl. 106—47)

This invention relates to the glass making art and more particularly to a method of changing the glass composition in a continuously operating tank furnace.

Heretofore, when changing from regular to glare-resistant glass, the usual procedure was to shut down the furnace and begin over again with a clean tank and the batch material used in making glare-resistant glass. Also, when it was desired to discontinue the manufacture of glare-resistant glass and return to the process of making regular glass, it was necessary to shut down, completely clean out the tank, and start over again. This resulted in greatly increasing the over-all cost of production for both types of glass.

There are innumerable advantages well known to those skilled in the art in avoiding the necessity for shutting down a furnace. Also, it is desirable to maintain the furnace in balance with a constant amount of material kept in the tank. Many difficulties that may otherwise occur are avoided by keeping the tank in continuous operation during the transition from one glass composition to another, but heretofore this has been considered to be impossible, particularly when dealing with such widely different compositions as clear plate and window glass and glare reducing or heat-absorbing glass.

Accordingly, it is an object of this invention to provide a method of changing the composition of the glass produced in a continuous tank furnace while maintaining the furnace in continuous operation.

Another object of this invention is to provide a method of changing the glass composition produced in the tank at a rapid enough rate to allow the glass making process to take place during the change and effect a cost savings over the transition methods heretofore used.

A further object of this invention is to provide a method of changing the composition of glass in a tank during the continuous operation thereof while maintaining substantially the same amount of glass in the tank at all times during the transition period.

A still further object of this invention is to provide a method of changing the composition of glass in large continuous-type tanks while maintaining the tanks in continuous operation.

Still another object of this invention is to provide a method of changing from a glass composition having a low fixed percentage of iron to a glass composition having a high fixed percentage of iron, or vice versa, while maintaining the tank furnace in continuous operation.

It has now been found that these and other objects may be accomplished by calculating the amount of difference in ingredients between the present and the desired composition based on the amount of glass material in the tank, altering the ingredients in the batch in a fixed percentage of this calculated difference during a first period, altering the ingredients in the batch in a smaller fixed percentage of this calculated amount during subsequent periods, and thereafter adding the regular batch ingredients as determined by the regular procedure for maintaining proper composition.

The present invention is particularly applicable when changing from regular glass to glare-resistant or highly glare-resistant glass and from glare-resistant glass to regular glass. The variations of ingredients present in a representative regular, glare-resistant, and a representative highly glare-resistant glass are illustrated in the table as follows:

TABLE

| Material | Percent in Regular Glass | Percent in Glare-Resistant Glass | Percent in Highly Glare-Resistant Glass |
|---|---|---|---|
| $Fe_2O_3$ | 0.120 | 0.475 | 5.0 |
| $Co_3O_4$ | 0.000 | 0.0008 | 0.000 |

When discussed herein the amount of iron is expressed as percent $Fe_2O_3$, but it is to be understood that some of the iron in the glare-resistant glass is in the form of FeO. For example, the statement that the desired glare-resistant glass contains 0.475% $Fe_2O_3$ is not to be construed to mean that the $Fe_2O_3$ actually existing in the glass amounts to 0.475%, but that if all of the iron were in the form of $Fe_2O_3$, the amount would be 0.475%. The figure is given to represent the iron in the glass and for the sake of convenience it is based on percent $Fe_2O_3$. Also, it should be understood that there may be a variation in some of the other components of the finished glass, but that the variation in the concentration of iron is the important factor.

In the examples hereinafter given to illustrate the transition from regular to glare-resistant glass and from glare-resistant to regular glass, a tank is used which contains about 1100 tons of molten glass and about 350 tons of batch is filled into it while approximately 280 tons of finished glass is removed from it during each 24 hour period. During the period that the glass is being changed from regular to glare-resistant glass or vice versa, the glass is of questionable commercial value. Accordingly, it is important to have a transition period of as short a duration as possible in order to prevent the accumulation of large quantities of this glass which may be unmarketable. It is contemplated that this glass may be analyzed and used as a cullet in a special batch for the production of glare-resistant glass. This requires an analysis to determine the percentage of iron and cobalt so that the percentage of these materials may be properly adjusted in the batch. The exact percentage for glare-resistant glass is not critical for some purposes although when such glass is used for automobile glass, it must satisfy the Federal specifications and the A.S.E. code. However, the main reason that transition glass is generally only good for cullet is because such glass usually contains ream which disturbs the optical properties of the glass. However, a certain amount of such transition glass may be used for purposes in which the optical properties are unimportant such as for casting transparent sheets of polymethyl methacrylate plastic.

In changing from the regular to glare-resistant glass the deficiency of $Fe_2O_3$ in the tank is .355% or 7810 lbs. in the 1100 tons of glass material in the tank. Since the rouge used contains 99.4% $Fe_2O_3$, 7857 lbs. of rouge would be needed for 100% conversion of the regular glass in the tank. The amount of $Co_3O_4$ required for 100% conversion of the regular glass in the tank is 17.6 lbs. In order to prevent the addition of too much $Fe_2O_3$ and $Co_3O_4$, fixed percentages of these calculated deficiencies are added; and since the glass first removed contains less than the required amounts of $Fe_2O_3$, the calculated amount for 100% conversion of the material in the tank is never actually added. Generally the glare-resistant composition is obtained in the tank when about 43%–75% of these calculated amounts are added. The more rapid the rate of conversion the higher this percentage becomes. When the rate of transition is too high, that is with more than 75% of the calculated amounts added, ream problems become serious, and actually lengthen the transition time from good regular glass to optically good glare-resistant glass, or may even seriously upset the balance of the tank. However, high transition rates are desired, and although percentages smaller than 43% may be operable, the transition period becomes excessively long. The addition may be made as illustrated by the first four of the following examples:

*Example 1*

In changing from regular to glare-resistant glass the theoretically required amount of $Fe_2O_3$ and $Co_3O_4$ is calculated as shown above. During the first 24 hour period 25% of this calculated amount (material containing 1952 lbs. $Fe_2O_3$ and 4.4 lbs. $Co_3O_4$) is added to the regular batch for glare-resistant glass. During the second 24 hour period, 12½% of the calculated ingredients are added to the batch and 6¼% is added to the third 24 hour period. The finished glass is analyzed and any remaining deficiency is now added and the fining tank is operated according to the usual procedure for making glare-resistant glass.

*Example 2*

In changing from regular to glare-resistant glass, the theoretically required amount of $Fe_2O_3$ and $Co_3O_4$ is calculated as shown above. During a first 24 hour period 32½% of this calculated amount is added to the batch for glare-resistant glass and then 11¼% is added during the next 24 hour period. The production of glare-resistant glass is now continued according to the standard procedure.

*Example 3*

In changing from regular to glare-resistant glass, the theoretically required amount of $Fe_2O_3$ and $Co_3O_4$ is calculated as shown above. During a 15 hour period, 70% of this amount is added to the batch used for making glare-resistant glass. The glass being removed now has substantially the desired composition and any further adjustments are made according to the usual procedure for making glare-resistant glass.

*Example 4*

A tank which has been changed from glare-resistant glass to regular glass is changed back to glare-resistant glass by following the procedure of Example 3 except that 60% of the calculated theoretical deficiency is added over the 15 hour conversion period. Less additional iron and cobalt needs to be added because a certain amount of glare-resistant glass remains on the bottom of the tank after the conversion from glare-resistant to regular glass.

*Example 5*

In changing from glare-resistant glass to regular glass, the $Fe_2O_3$ and $Co_3O_4$ are entirely eliminated in the batch ingredients and the process continued until the finished glass on the run contains about 0.035% $Fe_2O_3$. Then the normal batch is added which is used to produce glass having 0.12% $Fe_2O_3$. The finished glass is analyzed for $Fe_2O_3$ at least every twelve hours and the results are plotted in the conventional form to determine when the composition will reach 0.035% $Fe_2O_3$. Such low iron glass is suitable as regular glass, since formerly the percent of $Fe_2O_3$ in regular glass made by the company to which this application is assigned was 0.04.

*Example 6*

In changing from glare-resistant glass to regular glass, the $Fe_2O_3$ and $Co_3O_4$ are entirely eliminated in the batch ingredients and the process continued until the finished glass contains about 0.175% $Fe_2O_3$. Then the normal batch for regular glass is added. In the above described tank, this transition will take about five days.

The procedure of Example 6 has been found to be more satisfactory than the procedure of Example 5 and is preferred thereover, because the transition time is less and accordingly there is less loss of production. It has been found that the glass having the higher iron content tends to remain on the bottom of the tank, but that it does not adversely affect the production of the regular glass made from a tank which has been subjected to the process of Example 6.

In the following examples given to illustrate the transition from glare-resistant to highly glare-resistant glass, the tank used contains 700 tons of molten glass and about 200 tons of batch is added per day. In making this change from glare-resistant to highly glare-resistant glass, the theoretical deficiency of iron is calculated in the same manner as hereinbefore set forth for the conversion from regular to glare-resistant glass.

*Example 7*

In changing from glare-resistant to highly glare-resistant glass (see the table), the theoretical deficiency of $Fe_2O_3$ is calculated. Generally the desired highly glare-resistant composition is obtained when about 50% of the calculated deficiency has been added. This smaller percentage is due to the fact that the transition period is longer than is usually the case when changing from regular to glare-resistant glass. A tank containing 700 tons of glare-resistant glass material, which was being filled with 200 tons of batch per day, was charged with batch material for highly glare-resistant glass. During each of the first three days iron was added at the rate of one-eighth of the deficiency, and during the first half of the fourth day this rate was continued. At this time the glass being removed was close to the desired composition so that during the last half of the fourth day, one thirty-second of the deficiency was added. At the end of the fourth day the transition had been completed with a total of 46.875% of the calculated deficiency of iron having been added.

*Example 8*

In changing from highly glare-resistant to glare-resistant glass, the $Fe_2O_3$ is entirely eliminated from the batch ingredients and the process continued until the finished glass removed from the tank has the required amount of $Fe_2O_3$ for glare-resistant glass. Then the regular batch for glare-resistant glass is added. When the tank described in Example 7 is used the transition requires about seven days.

Examples 1 through 4 illustrate that the transition from regular to glare-resistant glass is accomplished in a period in which less batch is added than the amount of material continuously present in the tank. It is seen in Examples 3 and 4 the transition is accomplished during a period in which the amount of batch material added is only 20% of the amount of molten glass in the tank. Accordingly, comparatively rapid transition may be completed when the change in iron content is from 0.12% to 0.475%. The conversion from .475% to 5.0% iron generally requires longer because of the greater change in iron content. Even with this change, however, the transition was substantially completed when the amount of batch material added was equal in amount to the amount of material constantly maintained in the tank.

Generally it has been found desirable to decrease the amount of cullet in the batch material when a rapid increase in the amount of iron is to be accomplished. This decrease in cullet provides for a corresponding increase in batch sand so that the ratio of rouge to batch sand is kept down.

In changing back from a high-iron content glass to a regular low-iron content glass, the rate of transition is limited by the fact that substantially complete removal of the iron in the batch material is not sufficient to effect a rapid rate of reduction particularly when reducing to regular glass. However, the rate of transition is still of considerable advantage because it has been accomplished with only 41 hours elapsed time from good glass to good glass.

The procedures herein set forth have had the advantage of keeping the furnace in continuous operation and no seed trouble is encountered in the process. Ream has been a problem, particularly during the transition period, but generally disappears shortly after the end of the transition period.

It is to be understood that the forms of the invention disclosed herein are to be taken as the preferred embodiments thereof, and that various changes may be resorted to without departing from the spirit of the invention or the scope of the following claims.

I claim:

1. In the manufacture of glass, a method of changing from the production of regular glass to the production of glare-resistant glass containing appreciably larger amounts of iron oxide in a continuously operating tank furnace during the continuous operation thereof comprising, adding to the regular glass in said continuously operating furnace glare-resistant glass batch material along with substantially 43% to 75% of the calculated deficiency of iron oxide existing in said tank furnace at the start of the change-over period as compared to the desired iron oxide content required in said tank furnace for the production of glare-resistant glass, said iron oxide deficiency being added along with the glare-resistant glass batch material over a fixed period of time, said change-over period having a minimum limit for a given percentage of said calculated deficiency being added based on a minimum of about 15 hours when 70% of said calculated deficiency is added.

2. In the manufacture of glass, a method of changing from the production of glare-resistant glass containing an appreciable amount of iron oxide to the production of regular glass in a continuously operating tank furnace during the continuous operation thereof comprising, adding a regular glass batch material substantially void of iron oxide to said continuously operating tank furnace during a transition period until the finished glass being removed from said tank furnace has approximately the desired percentage of iron oxide required for regular glass, the minimum limit of said transition period being about 41 hours, and thereafter adding to the tank furnace glass batch material comprised of the desired proportion of the various ingredients required for the production of the regular glass.

References Cited in the file of this patent

UNITED STATES PATENTS

| | | |
|---|---|---|
| 805,139 | Hitchcock | Nov. 21, 1905 |
| 1,149,451 | Kann | Aug. 10, 1915 |
| 2,144,943 | Armistead | Jan. 24, 1939 |

UNITED STATES PATENT OFFICE
CERTIFICATE OF CORRECTION

Patent No. 2,900,264                                              August 18, 1959

Wilbur F. Brown

It is hereby certified that error appears in the printed specification of the above numbered patent requiring correction and that the said Letters Patent should read as corrected below.

Column 3, line 61, Example 5, strike out "on the run" and insert the same after "glass", second occurrence, in line 58; lines 61, 62 and 63, strike out "Then the normal batch is added which is used to produce glass having 0.12% $Fe_2O_3$." and insert the same after "0.04." in line 69, same column.

Signed and sealed this 23rd day of February 1960.

(SEAL)
Attest:

KARL H. AXLINE                                               ROBERT C. WATSON
Attesting Officer                                          Commissioner of Patents